United States Patent
Johnsen et al.

(10) Patent No.: US 9,219,718 B2
(45) Date of Patent: Dec. 22, 2015

(54) SYSTEM AND METHOD FOR SUPPORTING SUB-SUBNET IN AN INFINIBAND (IB) NETWORK

(71) Applicant: Oracle International Corporation, Redwood Shores, CA (US)

(72) Inventors: Bjørn Dag Johnsen, Oslo (NO); Line Holen, Fetsund (NO); Lars Paul Huse, Oppegård (NO); Ola Tørudbakken, Oslo (NO); Bartosz Bogdanski, Oslo (NO)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 14/272,165

(22) Filed: May 7, 2014

(65) Prior Publication Data

US 2014/0241208 A1   Aug. 28, 2014

Related U.S. Application Data

(63) Continuation of application No. 13/488,133, filed on Jun. 4, 2012, now Pat. No. 8,743,890.

(60) Provisional application No. 61/493,330, filed on Jun. 3, 2011.

(51) Int. Cl.
*H04L 12/28* (2006.01)
*H04L 29/06* (2006.01)
(Continued)

(52) U.S. Cl.
CPC .......... *H04L 63/0442* (2013.01); *H04L 9/3234* (2013.01); *H04L 9/3271* (2013.01); *H04L 41/12* (2013.01); *H04L 49/20* (2013.01); *H04L 63/083* (2013.01); *H04L 63/0876* (2013.01)

(58) Field of Classification Search
CPC .......................... H04L 49/20; H04L 63/0442
USPC .............. 370/254, 400, 401, 404, 352, 395.2; 709/224; 710/316; 713/600; 714/5
See application file for complete search history.

(56) References Cited

U.S. PATENT DOCUMENTS

| | | |
|---|---|---|
| 5,805,805 A | 9/1998 | Civanlar et al. |
| 5,964,837 A | 10/1999 | Chao et al. |

(Continued)

FOREIGN PATENT DOCUMENTS

| | | |
|---|---|---|
| CN | 1567827 | 1/2005 |
| CN | 1728664 | 2/2006 |

(Continued)

OTHER PUBLICATIONS

InfiniBandSM Trade Association, InfiniBandTM Architecture Specification, vol. 1, Release 1.2.1, Nov. 2007, pp. 1-1727.*

(Continued)

*Primary Examiner* — Brian D Nguyen
*Assistant Examiner* — Toan Nguyen
(74) *Attorney, Agent, or Firm* — Tucker Ellis LLP

(57) ABSTRACT

A system and method can support multiple domains in an InfiniBand (IB) fabric. The IB fabric can include one or more subnets, wherein each said subnet contains one or more switch nodes. Additionally, at least one said subnet can be divided into one or more sub-subnets, wherein each said sub-subnet is managed by a separate sub-subnet manager that is associated with a unique management key, and wherein said one or more sub-subnets are connected by one or more sub-subnet gateway switch nodes, wherein each sub-subnet gateway switch node belongs to one sub-subnet.

20 Claims, 4 Drawing Sheets

(51) Int. Cl.
  *H04L 9/32* (2006.01)
  *H04L 12/24* (2006.01)
  *H04L 12/931* (2013.01)

(56) References Cited

U.S. PATENT DOCUMENTS

| | | | |
|---|---|---|---|
| 6,463,470 B1 | 10/2002 | Mohaban et al. | |
| 6,594,759 B1 | 7/2003 | Wang | |
| 6,647,419 B1 | 11/2003 | Mogul | |
| 6,678,835 B1 | 1/2004 | Shah et al. | |
| 6,748,429 B1 | 6/2004 | Talluri et al. | |
| 6,829,685 B2 | 12/2004 | Neal et al. | |
| 6,904,545 B1 | 6/2005 | Erimli et al. | |
| 6,941,350 B1 | 9/2005 | Frazier et al. | |
| 6,963,932 B2 | 11/2005 | Bhat | |
| 6,978,300 B1 | 12/2005 | Beukema et al. | |
| 6,981,025 B1 | 12/2005 | Frazier et al. | |
| 6,985,956 B2 | 1/2006 | Luke et al. | |
| 7,023,811 B2 | 4/2006 | Pinto | |
| 7,069,468 B1 | 6/2006 | Olson | |
| 7,113,995 B1 | 9/2006 | Beukema et al. | |
| 7,185,025 B2 | 2/2007 | Rosenstock et al. | |
| 7,194,540 B2 | 3/2007 | Aggarwal et al. | |
| 7,200,704 B2 | 4/2007 | Njoku et al. | |
| 7,216,163 B2 | 5/2007 | Sinn | |
| 7,221,676 B2 | 5/2007 | Green | |
| 7,231,518 B1 | 6/2007 | Bakke | |
| 7,290,277 B1 | 10/2007 | Chou et al. | |
| 7,302,484 B1 | 11/2007 | Stapp et al. | |
| 7,356,841 B2 | 4/2008 | Wilson et al. | |
| 7,398,394 B1 | 7/2008 | Johnsen et al. | |
| 7,409,432 B1 | 8/2008 | Recio et al. | |
| 7,437,447 B2 | 10/2008 | Brey et al. | |
| 7,493,409 B2 | 2/2009 | Craddock et al. | |
| 7,500,236 B2 | 3/2009 | Janzen | |
| 7,633,955 B1 | 12/2009 | Saraiya et al. | |
| 7,634,608 B2 | 12/2009 | Droux | |
| 7,685,385 B1 | 3/2010 | Choudhary et al. | |
| 7,724,748 B2 | 5/2010 | Davis | |
| 7,783,788 B1 | 8/2010 | Quinn et al. | |
| 7,843,822 B1 | 11/2010 | Paul et al. | |
| 7,860,961 B1 | 12/2010 | Finkelstein et al. | |
| 7,873,711 B2 | 1/2011 | Adams et al. | |
| 8,184,555 B1 | 5/2012 | Mouton et al. | |
| 8,234,407 B2 | 7/2012 | Sugumar | |
| 8,327,437 B2 | 12/2012 | McAlister | |
| 8,331,381 B2 | 12/2012 | Brown et al. | |
| 8,335,915 B2 | 12/2012 | Plotkin et al. | |
| 8,423,780 B2 | 4/2013 | Plotkin et al. | |
| 8,549,281 B2 | 10/2013 | Samovskiy et al. | |
| 8,583,921 B1 | 11/2013 | Shu | |
| 8,924,952 B1 | 12/2014 | Hou | |
| 8,972,966 B2 | 3/2015 | Kelso | |
| 2002/0059597 A1 | 5/2002 | Kikinis et al. | |
| 2002/0120720 A1 | 8/2002 | Moir | |
| 2002/0188711 A1 | 12/2002 | Meyer et al. | |
| 2003/0009487 A1 | 1/2003 | Prabakaran et al. | |
| 2003/0009551 A1 | 1/2003 | Benfield et al. | |
| 2003/0079040 A1 | 4/2003 | Jain et al. | |
| 2003/0093509 A1 | 5/2003 | Li et al. | |
| 2003/0105903 A1 | 6/2003 | Garnett et al. | |
| 2003/0120852 A1* | 6/2003 | McConnell et al. | 710/316 |
| 2003/0208572 A1 | 11/2003 | Shah et al. | |
| 2004/0022245 A1 | 2/2004 | Forbes et al. | |
| 2004/0031052 A1 | 2/2004 | Wannamaker | |
| 2004/0153849 A1 | 8/2004 | Tucker et al. | |
| 2004/0162973 A1 | 8/2004 | Rothman | |
| 2004/0193768 A1 | 9/2004 | Carnevale | |
| 2004/0199764 A1 | 10/2004 | Koechling et al. | |
| 2004/0220947 A1 | 11/2004 | Aman et al. | |
| 2004/0249928 A1 | 12/2004 | Jacobs et al. | |
| 2004/0255286 A1 | 12/2004 | Rothman | |
| 2005/0044363 A1 | 2/2005 | Zimmer et al. | |
| 2005/0071382 A1 | 3/2005 | Rosenstock et al. | |
| 2005/0071709 A1* | 3/2005 | Rosenstock et al. | 714/5 |
| 2005/0091396 A1 | 4/2005 | Nilakantan et al. | |
| 2005/0105554 A1 | 5/2005 | Kagan et al. | |
| 2005/0125520 A1 | 6/2005 | Hanson et al. | |
| 2005/0182701 A1 | 8/2005 | Cheston | |
| 2005/0182831 A1 | 8/2005 | Uchida et al. | |
| 2005/0182853 A1 | 8/2005 | Lewites et al. | |
| 2005/0198164 A1 | 9/2005 | Moore et al. | |
| 2005/0198250 A1 | 9/2005 | Wang | |
| 2005/0213608 A1 | 9/2005 | Modi et al. | |
| 2005/0273641 A1* | 12/2005 | Sandven et al. | 713/600 |
| 2006/0079278 A1 | 4/2006 | Ferguson et al. | |
| 2006/0195560 A1 | 8/2006 | Newport | |
| 2006/0221975 A1 | 10/2006 | Lo et al. | |
| 2006/0233168 A1 | 10/2006 | Lewites et al. | |
| 2007/0016694 A1 | 1/2007 | Achler | |
| 2007/0050763 A1 | 3/2007 | Kagan | |
| 2007/0110245 A1 | 5/2007 | Sood et al. | |
| 2007/0129917 A1 | 6/2007 | Blevins et al. | |
| 2007/0195794 A1 | 8/2007 | Fujita et al. | |
| 2007/0206735 A1 | 9/2007 | Silver et al. | |
| 2007/0253328 A1 | 11/2007 | Harper et al. | |
| 2008/0031266 A1 | 2/2008 | Tallet et al. | |
| 2008/0144614 A1 | 6/2008 | Fisher et al. | |
| 2008/0159277 A1 | 7/2008 | Vobbilisetty et al. | |
| 2008/0183853 A1 | 7/2008 | Manion et al. | |
| 2008/0192750 A1 | 8/2008 | Ko et al. | |
| 2008/0201486 A1 | 8/2008 | Hsu et al. | |
| 2008/0209018 A1 | 8/2008 | Hernandez et al. | |
| 2008/0229096 A1 | 9/2008 | Alroy et al. | |
| 2008/0250125 A1 | 10/2008 | Brey et al. | |
| 2008/0310422 A1 | 12/2008 | Booth et al. | |
| 2009/0049164 A1 | 2/2009 | Mizuno | |
| 2009/0116404 A1 | 5/2009 | Mahop et al. | |
| 2009/0141728 A1 | 6/2009 | Brown et al. | |
| 2009/0178033 A1 | 7/2009 | Challener | |
| 2009/0216853 A1 | 8/2009 | Burrow et al. | |
| 2009/0307499 A1 | 12/2009 | Senda | |
| 2010/0020806 A1 | 1/2010 | Vahdat et al. | |
| 2010/0080117 A1 | 4/2010 | Coronado et al. | |
| 2010/0082853 A1 | 4/2010 | Block et al. | |
| 2010/0138532 A1* | 6/2010 | Glaeser et al. | 709/224 |
| 2010/0142544 A1 | 6/2010 | Chapel et al. | |
| 2010/0166167 A1 | 7/2010 | Karimi-Cherkandi et al. | |
| 2010/0235488 A1 | 9/2010 | Sharma et al. | |
| 2010/0268857 A1 | 10/2010 | Bauman et al. | |
| 2010/0306772 A1 | 12/2010 | Arnold et al. | |
| 2011/0072206 A1 | 3/2011 | Ross et al. | |
| 2011/0110366 A1 | 5/2011 | Moore et al. | |
| 2011/0138082 A1 | 6/2011 | Khatri | |
| 2011/0138185 A1 | 6/2011 | Ju et al. | |
| 2011/0173302 A1 | 7/2011 | Rider | |
| 2011/0209202 A1 | 8/2011 | Otranen | |
| 2011/0222492 A1 | 9/2011 | Borsella et al. | |
| 2011/0264577 A1 | 10/2011 | Winbom et al. | |
| 2012/0005480 A1 | 1/2012 | Batke et al. | |
| 2012/0039331 A1 | 2/2012 | Astigarraga et al. | |
| 2012/0195417 A1 | 8/2012 | Hua et al. | |
| 2012/0239928 A1 | 9/2012 | Judell | |
| 2012/0290698 A1 | 11/2012 | Alroy et al. | |
| 2013/0041969 A1 | 2/2013 | Falco et al. | |
| 2013/0046904 A1 | 2/2013 | Hilland | |
| 2013/0159865 A1 | 6/2013 | Smith et al. | |
| 2013/0179870 A1 | 7/2013 | Kelso | |
| 2013/0191622 A1 | 7/2013 | Sasaki | |
| 2014/0095853 A1 | 4/2014 | Sarangshar | |
| 2014/0095876 A1 | 4/2014 | Smith et al. | |

FOREIGN PATENT DOCUMENTS

| | | |
|---|---|---|
| EP | 2051436 | 4/2009 |
| JP | 2002247089 A | 8/2002 |
| JP | 2004166263 | 6/2004 |
| JP | 2006157285 | 6/2006 |
| JP | 2007501563 | 1/2007 |
| JP | 2008054214 A | 3/2008 |
| JP | 2009510953 | 3/2009 |
| WO | 0190838 | 11/2001 |

(56) References Cited

FOREIGN PATENT DOCUMENTS

WO    2008099479    8/2008
WO    2012037518    3/2012

OTHER PUBLICATIONS

Shanley, Tom, "Infiniband Network Architecture", Pearson Education, Copyright © 2002 by MindShare, Inc., published Oct. 2002. p. 387-394.

European Patent Office, International Searching Authority, International Search Report and Written Opinion dated Sep. 17, 2012 for International Patent Application PCT/US2012/040775, 13 pages.

European Patent Office, International Searching Authority, International Search Report and Written Opinion dated Sep. 26, 2013 for International Patent Application No. PCT/US2013/040639, 10 pages.

Aurelio Bermudez, On the InfiniBand Subnet Discovery Process, IEEE The Computer Society 2003, pp. 1-6.

Tom Shanley, Infiniband Network Architecture, Pearson Education 2002, p. 559, 561.

Tom Shanley, Infiniband Network Architecture, Pearson Education 2002, (excerpt), chapter—Detailed Description of the Link Layer, p. 390-392, 485, 491-493, 537-539.

Manhee Lee, Security Enhancement in Infiniband Architecture, IEEE, vol. 19, Apr. 2005, pp. 1-18.

State Intellectual Property Office of the People's Republic of China dated May 5, 2015 for Chinese Patent Application No. 201180039850.7, 2 pages.

Search Report from the State Intellectual Property Office of the People's Republic of China dated Jun. 3, 2015 for Chinese Application No. 201180039807.0, 2 pages.

Tom Shanley, "Infiniband Network Architecture", Copyright © 2002 by MindShare, Inc., ISBN: 0-321-11765-4, pp. 83-87, 95-102, 205-208, 403-406.

V. Kashyap, "IP over InfiniBand (IpoIB) Architecture", Network Working Group RFC 4392, Apr. 2006, 22 pages, retrieved on Apr. 9, 2015 from: <http://www.ietf.org/rfc/rfc4392>.

State Intellectual Property Office of the People's Republic of China, Search Report dated May 29, 2015 for Chinese Patent Application No. 201180040064.9, 1 page.

State Intellectual Property Office of the People'S Republic of China, Search Report dated Sep. 9, 2015 for Chinese Patent Application No. 201280027279.1, 2 pages.

\* cited by examiner

SYSTEM AND METHOD FOR SUPPORTING SUB-SUBNET IN AN INFINIBAND (IB) NETWORK

CLAIM OF PRIORITY

This application is a continuation application of U.S. patent application Ser. No. 13/488,133, filed Jun. 4, 2012, now U.S. Pat. No. 8,743,890, issued Jun. 3, 2014 entitled "SYSTEM AND METHOD FOR SUPPORTING SUB-SUBNET IN AN INFINIBAND (IB) NETWORK", and which application claims the benefit of priority to:

U.S. Provisional Patent Application No. 61/493,330, entitled "STATEFUL SUBNET MANAGER FAILOVER IN A MIDDLEWARE MACHINE ENVIRONMENT" filed Jun. 3, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

FIELD OF INVENTION

The present invention is generally related to computer systems, and is particularly related to supporting an InfiniBand (IB) network.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the Open Fabrics Alliance. OFED is open source and is available for both GNU/Linux and Microsoft Windows.

SUMMARY

Described herein is a system and method that can support multiple domains in an InfiniBand (IB) fabric. The IB fabric can include one or more subnets, wherein each said subnet contains one or more switch nodes. Additionally, at least one said subnet can be divided into one or more sub-subnets, wherein each said sub-subnet is managed by a separate sub-subnet manager that is associated with a unique management key, and wherein said one or more sub-subnets are connected by one or more sub-subnet gateway switch nodes, wherein each sub-subnet gateway switch node belongs to one sub-subnet.

DETAILED DESCRIPTION

Described herein is a system and method that can support multiple independent domains in an interconnected network, such as an InfiniBand (IB) network.

Figure 1:
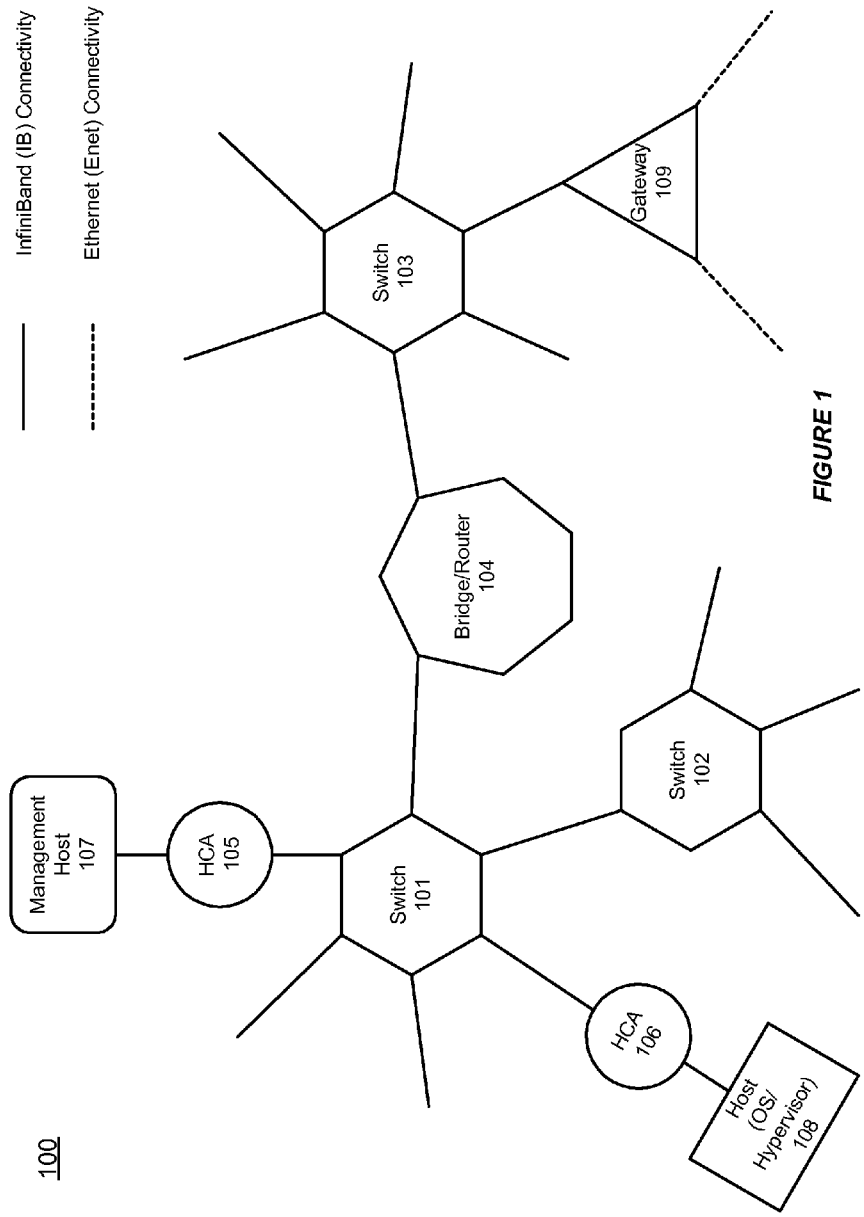
FIG. 1 shows an illustration of a fabric model in a middleware environment in accordance with an embodiment of the invention.

FIG. 1 shows an illustration of a fabric model in a middleware environment in accordance with an embodiment of the invention. As shown in FIG. 1, an interconnected network, or a fabric 100, can include switches 101-103, bridges and routers 104, host channel adapters (HCAs) 105-106 and designated management hosts 107. Additionally, the fabric can include, or be connected to, one or more hosts 108 that are not designated management hosts.

The designated management hosts 107 can be installed with HCAs 105-106, a network software stack and relevant management software in order to perform network management tasks. Furthermore, firmware and management software can be deployed on the switches 101-103, and the bridges and routers 104 to direct traffic flow in the fabric. Here, the host HCA drivers, OS and Hypervisors on hosts 108 that are not designated management hosts may be considered outside the scope of the fabric from a management perspective.

The fabric 100 can be in a single media type, e.g. an IB only fabric, and be fully connected. The physical connectivity in the fabric ensures in-band connectivity between any fabric components in the non-degraded scenarios. Alternatively, the fabric can be configured to include Ethernet (Enet) connectivity outside gateway (GW) external ports on a gateway 109. Additionally, it is also possible to have independent fabrics operating in parallel as part of a larger system. For example, the different fabrics can be only indirectly connected via different HCAs or HCA ports.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the subnet including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and ensure proper load balancing between all source and destination pairs.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a Send Queue (SQ) and a Receive Queue (RQ). There is one such pair present at each end-node that is participating in the communication. The send queue holds work requests to be transferred to the remote node, while the receive queue holds information on what to do with the data received from the remote node. In addition to the QPs, each HCA can have one or more Completion Queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow). Also, SMPs can use either the routing that the SM sets up based on end-port Local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state changes to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The subnet administrator (SA) is a subnet database associated with the master SM to store different information about a subnet. The communication with the SA can help the end-node to establish a QP by sending a general service management datagram (MAD) through a designated QP, e.g. QP1. Both sender and receiver require information such as source/destination LIDs, service level (SL), maximum transmission unit (MTU), etc. to establish communication via a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions that the host port is supposed to be a member of. (i.e. in essence equivalent to switch enforced VLAN control in Ethernet LANs.)

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

M_Keys can be used as the basic protection/security mechanism in the IB architecture for SMP access. An M_Key is a 64 bit value that can be associated individually with each individual node in the IB subnet, and where incoming SMP operations may be accepted or rejected by the target node depending on whether the SMP includes the correct M_Key value (i.e. unlike P_Keys, the ability to specify the correct M_Key value-like a password-represents the access control).

By using an out-of-band method for defining M_Keys associated with switches, it is possible to ensure that no host node is able to set up any switch configuration, including partition membership for the local switch port. Thus, an M_Key value is defined when the switch IB links becomes operational. Hence, as long as the M_Key value is not compromised or "guessed" and the switch out-of-band access is secure and restricted to authorized fabric administrators, the fabric is secure.

Furthermore, the M_Key enforcement policy can be set up to allow read-only SMP access for all local state information except the current M_Key value. Thus, it is possible to protect the switch based fabric from un-authorized (re-)configuration, and still allow host based tools to perform discovery and diagnostic operations.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and commands can be implemented based on use of such SMPs for discovery, diagnostics and control independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

Allow Fabric to be Divided into Multiple Domains

An IB fabric can be divided into multiple independent domains, e.g. multiple subnetsand/or multiple sub-subnets within one or more subnets. The complete fabric can have a topology and a corresponding global routing that ensures deadlock freedom for any combination of intra- and inter-domain communication flows.

Furthermore, the IB fabric with different domains can support subnet manager high availability (HA) configuration, subnet manager version upgrade, and core configuration parameters. The fabric can support a global unique identifier (GUID) based end-point identification within each different sub-subnet, and allows the path lookup to have fabric global scope. Additionally, the partition configuration, e.g. the allocation of P_Key values and the associated protection usage, can be coordinated throughout the global fabric.

Figure 2:
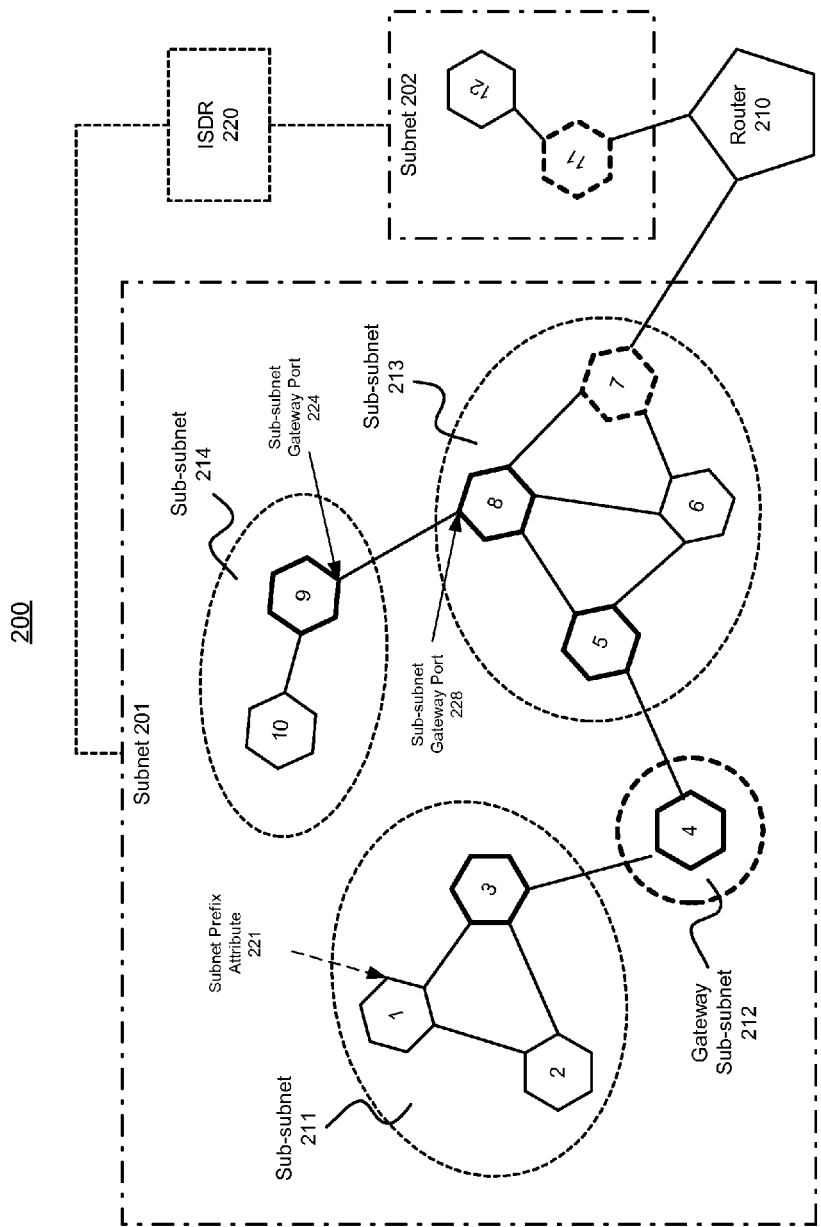
FIG. 2 shows an illustration of supporting multiple independent domains in an IB fabric in accordance with an embodiment of the invention.

FIG. 2 shows an illustration of supporting multiple independent domains in an IB fabric in accordance with an embodiment of the invention. As shown in FIG. 2, a fabric 200 includes one or more subnets 201-202, which are connected by different router ports on one or more router nodes 210. Here, the subnet 201 in the fabric 200 contains the switch nodes 1-10, whereas the subnet 202 contains the switch nodes 11-12. The discovery of a subnet gateway switch, e.g. the switch nodes 7 and 11, can be based on a discovery of a router port on the router 210 by a SM.

Furthermore, the subnet 201 in the fabric 200 can be divided into multiple independent sub-subnets 211-214. For example, the sub-subnet 211 includes the switch nodes 1-3, the sub-subnet 213 includes the switch nodes 5-8, and the sub-subnet 214 includes the switch nodes 9-10. The sub-subnets 211-214 can be connected by different sets of gateway switch nodes where each gateway switch node belongs to exactly one sub-subnet. For example, the sub-subnets 213 and 214 are separated by a set of gateway switch nodes 8 and 9, whereas the gateway switch node 8 belongs to the sub-subnet 213 and the gateway switch node 9 belongs to the sub-subnet 214.

Further, as shown in FIG. 2, the subnet 201 can include an independent gateway sub-subnet 212 between two ordinary sub-subnets 211 and 213. The gateway sub-subnet 212 is a special construction in the fabric that can support a management model similar to the router model. Thus, the connectivity through the gateway sub-subnet 212 can be managed independently from the ordinary sub-subnets 211 and 213 in a way that is similar to ordinary routers that can be managed independently of the subnets they connect to.

Each sub-subnet 211-214 in the fabric 200 can be independently discovered and routed, and there can be a different set of redundant SMs, or sub-subnet managers (SSMs), operating in each sub-subnet 211-214. The discovery of a sub-subnet gateway switch in a sub-subnet, e.g. switch node 3 in the sub-subnet 211, can be based on discovering a (remote) switch port that has non-local M_Key protection by a local SM. This non-local M_Key protection can have a subnet prefix that is within a defined set of known neighbor sub-subnet prefixes, but is different from the local sub-subnet prefix. Additionally, LID space (e.g. legacy 16 bit) can be shared between sub-subnets within the same subnet.

Additionally, a subnet prefix attribute 221, which can be the SMA port information attribute for a switch management port, can be used to record a sub-subnet number. This subnet prefix attribute 221 can be used to contain both a subnet number and a sub-subnet number, e.g. containing the subnet number in one part of the subnet prefix attribute and containing the sub-subnet number another non-overlapping part of the subnet prefix attribute.

In accordance with an embodiment of the invention, an inter-domain discovery and routing engine, e.g. a special inter-(sub)subnet discovery and routing engine (ISDR) 220, can be responsible for establishing a global fabric view. Using the ISDR, the domain gateway ports in the fabric, e.g. the subnet gateway ports and the sub-subnet gateway ports, can be identified, and the overall global fabric connectivity and topology can be determined based on the topologies of each (sub-)subnet and the inter(sub-)subnet connectivity.

The ISDR can operate in either a fixed-route mode or an on-demand-route mode.

In the fixed-route mode, the ISDR can analyze the topology, and determine if a suitable routing engine exists. Then, the ISDR can establish a deadlock free routing with one or more paths between all relevant end-ports (i.e. just like an SM can do for a single subnet).

In the fixed-route mode, a re-routing of a subnet or a sub-subnet may involve a re-routing of the complete fabric. Sub-paths can be established between the local end-ports within each sub-subnet. Furthermore, routes can be established within each subnet between the relevant gateway ports in a manner similar to a normal pair of end-ports. Then, these routes and sub-paths can be utilized to establish the end-to-end paths from local endpoints to remote end-ports. Here, in a sub-subnet, additional remote end-points can be set up by handling the relevant remote destination local identifier (DLID) as an alias LID for the local gateway port, whereas in a subnet, the local router port LID is used as DLID.

In the on-demand route mode, the ISDR does not establish a routing until a request for a path between two end points is received. The ISDR can then determine which gateway paths can be used under what SL/VL constraints in each involved subnet and/or sub-subnet to establish a deadlock free end-to-end path.

In order to set up a route dynamically, the ISDR can select a combination (trace) of gateway ports that matches deadlock freedom and other criteria such as quality of service (QoS). Then, the ISDR can establish the path through each subnet by leveraging the existing sub-paths and/or establish new sub-paths through the various subnets and sub-subnets in cooperation with the relevant subnet managers.

In order to provide GUID and path information to SA clients in each subnet and/or sub-subnet, the local SA can first determine if both the source and destination endpoints belong to the local subnet and/or sub-subnet. If at least one endpoint belongs to a remote subnet and/or sub-subnet, the SA can query the ISDR for the fabric global view and then provide the relevant SA responses to the local SA client. Additionally, the ISDR can register for notifications from the local SMs for various subnets and/or sub-subnets and issue SA requests in order to maintain an accurate view of the global fabric state.

In accordance with an embodiment of the invention, fat-trees can be used for sub-subnetting a single IB fabric. Within each fat-tree, individual sub-trees can be configured as independent sub-subnets. Using the fat-trees, each sub-subnet can be optimally routed for intra-sub-subnet connectivity without having a global fabric scope. Also, adding more sub-subnets does not impose a deadlock danger as long as the strict up-down routing regime is observed and the strict hierarchical fat-tree topology is maintained.

The balance between inter-sub-subnet traffic and deadlock freedom for routes between peers in a fabric can be achieved, e.g. using up-down link hierarchies. The inter-subnet and inter-sub-subnet communication can have fabric wide unique P_Key values, i.e. the P_Key values can be allocated from a fabric global pool. For both sub-subnetting and subnetting cases, it is possible to have a non-unique per subnet and/or per sub-subnet private P_Key value range as long as the private P_Key is only used for intra-domain communication.

Additionally, gateway implementations can facilitate direct communication between peers that do not share a common partition but use relevant secure mapping functions, e.g. via a transparent handling of packet invariant cyclic redundancy check (ICRC). The gateway implementations can support using virtual global unique identifiers (vGUIDs) in multiple subnets and/or sub-subnets. Also, the gateway implementations can support using vGUIDs within individual partitions that may or may not span across multiple subnets and/or sub-subnets.

In accordance with an embodiment of the invention, the route connectivity can be dynamically maintained within a fabric in a way that ensures that only accredited components and connectivity is utilized. Thus, the components and connectivity that are not yet accredited may be ignored in a way similar to the handling of accidental connectivity. Unlike the handling of accidental connectivity, the complete connectivity may be explored, and represented within the local sub-subnet in controlled rerouting, even though the routing and path set-up logic may not take such connectivity into account.

Figure 3:
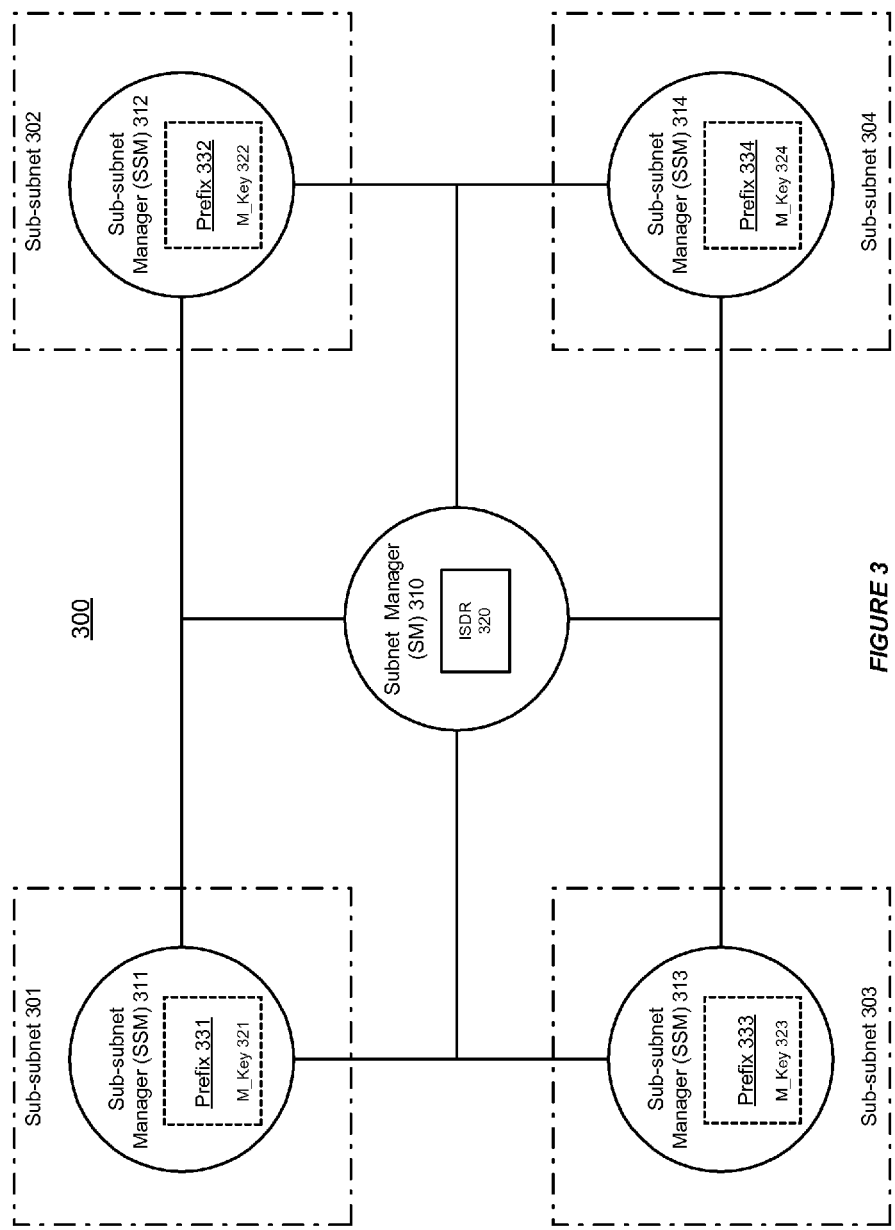
FIG. 3 shows an illustration of two step sub-subnet initialization in an IB fabric in accordance with an embodiment of the invention.

FIG. 3 shows an illustration of two step subnet initialization in an IB fabric in accordance with an embodiment of the invention. As shown in FIG. 3, a subnet in an IB fabric 300 includes multiple sub-subnets 301-304, each of which is managed by a sub-subnet manager (SSM) 311-314 that is associated with a unique M_key 321-324.

During the two-step subnet initialization, only the designated management nodes, e.g. the SSMs 311-314, may be allowed to communicate with each other at the first step. The policies for the connectivity between other nodes in each sub-subnet can be established in-band between the SSMs, e.g. via Internet Protocol over InfiniBand (IPoIB), before all nodes are set up at the second step.

In accordance with an embodiment of the invention, each of the M_keys 321-324 can be associated with a different (sub-)subnet prefix 331-334. Having the prefix 331-334 or a sub-subnet number encoded as part of the M_Key 321-324 may require that a remote sub-subnet M_Key is exposed to (or known by) a different remote sub-subnet manager, which may be in conflict with ensuring isolation and protection among sub-subnet managers in different sub-subnets.

Furthermore, each sub-subnet 301-304 can have a different M_Key value range, which can be used along with the per individual SM instance private M_Key value to ensure automatic fencing of old master SMs or SSMs after a standby SM or SSM takes over. Also, local port M_Keys can be updated to ensure that a runaway fabric component is not able to change or establish any fabric state until it has re-synched with relevant peers.

In accordance with an embodiment of the invention, there can be a designated SM 310 that is responsible for managing the subnet 300. Additionally, the designated SM 310 can maintain an ISDR 320 for establishing a global fabric view.

Figure 4:
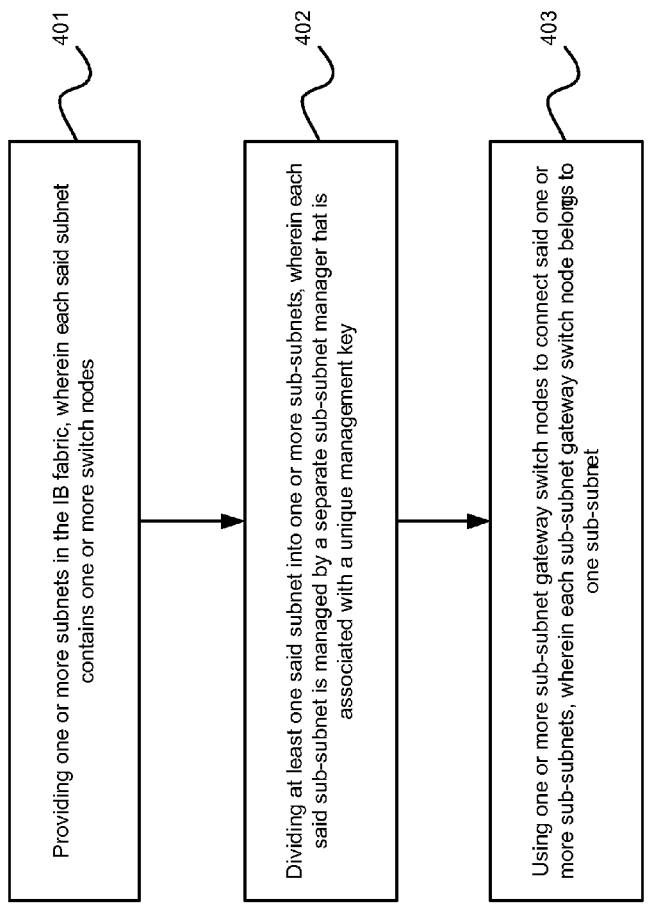
FIG. 4 illustrates an exemplary flow chart for supporting multiple independent domains in an IB fabric in accordance with an embodiment of the invention.

FIG. 4 illustrates an exemplary flow chart for supporting multiple independent domains in an IB fabric in accordance with an embodiment of the invention. As shown in FIG. 4, at step 401, one or more subnets can be provided in the IB fabric, wherein each said subnet contains one or more switch nodes. Then, at step 402, at least one said subnet can be divided into one or more sub-subnets, wherein each said sub-subnet can be managed by a separate SSM that is associated with a unique management key. Finally, at step 403, one or more sub-subnet gateway switch nodes can connect said one or more sub-subnets, wherein each sub-subnet gateway switch node belongs to one sub-subnet.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting multiple domains in an InfiniBand (IB) fabric, comprising:
   a plurality of subnets, including a first subnet and a second subnet wherein the first subnet comprises a first subnet manager (SM), and the second subnet comprises a second subnet manager (SM);
   wherein the second subnet comprises a plurality of sub-subnets, including at least a first sub-subnet (SSN) and a second sub-subnet (SSN);
   wherein said first sub-subnet comprises a first sub-subnet gateway switch node and a first sub-subnet manager that is associated with a first unique management key, and a first SSN prefix attribute which separately identifies the second subnet and the first SSN; and wherein said second SSN comprises a second sub-subnet gateway switch node, and a second sub-subnet manager (SSM) associated with a second unique management key and a second SSN prefix attribute which separately identifies the second subnet and the second SSN.

2. The system according to claim 1, wherein:
the first SSN prefix attribute is encoded as part of said first unique management key, and the second SSN prefix attribute is encoded as part of said second unique management key.

3. The system according to claim 1, further comprising:
a third sub-subnet (SSN);
wherein the first SSN is a gateway SSN that is between the second SSN and the third SSN, and wherein connectivity through said gateway SSN is managed independently from said second SSN and third SSN.

4. The system according to claim 1, wherein:
each sub-subnet gateway switch node can be discovered by a sub-subnet manager in the sub-subnet, when the sub-subnet manager discovers a switch port that has a non-local management key protection, wherein the non-local management key protection has a subnet prefix that is within a defined set of known neighbor sub-subnet prefixes.

5. The system according to claim 1, wherein:
the first subnet comprises a plurality of sub-subnets, including at least a third sub-subnet (SSN) and a fourth sub-subnet (SSN);
wherein said third sub-subnet comprises a third sub-subnet gateway switch node and a third sub-subnet manager that is associated with a third unique management key, and a third SSN prefix attribute which separately identifies the first subnet and the third SSN; and
wherein said fourth SSN comprises a fourth sub-subnet gateway switch node, and a fourth sub-subnet manager (SSM) associated with a fourth unique management key and a fourth SSN prefix attribute which separately identifies the first subnet and the fourth SSN.

6. The system according to claim 1, wherein:
said first and second SSN prefix attributes each comprise two non-overlapping parts wherein one Part contains a subnet number and another part contains the sub-subnet number.

7. The system according to claim 1, wherein:
each of the first sub-subnet gateway switch node and second sub-subnet gateway switch node has at least one sub-subnet gateway port connecting to another sub-subnet gateway switch, and
said first subnet comprises a first subnet gateway switch which has at least one subnet gateway port connecting to a router port.

8. The system according to claim 1, further comprising:
an inter-domain discovery and routing engine that is responsible for establishing a global fabric view and establishing a deadlock free routing with one or more paths between different end-ports in the IB fabric.

9. The system according to claim 8, wherein:
the inter-domain discovery and routing engine operates in either a fixed-route mode or an on-demand-route mode, and wherein
in the fixed-route mode, the inter-domain discovery and routing engine can analyze the topology, and determine if a suitable routing engine exists, and in the on-demand-route mode, the inter-domain discovery and routing engine does not establish a routing until a request for a path between two end points is received.

10. The system according to claim 1, wherein:
during fabric initialization, the first and second sub-subnet managers are allowed to communicate with each other before other nodes are set up.

11. A method for supporting multiple domains in an InfiniBand (IB) fabric, comprising:
providing a plurality of subnets, including a first subnet and a second subnet wherein the first subnet comprises a first subnet manager (SM), and the second subnet comprises a second subnet manager (SM);
configuring the second subnet to comprise a plurality of sub-subnets, including at least a first sub-subnet (SSN) which comprises a first sub-subnet gateway switch node and a first sub-subnet manager, and a second sub-subnet (SSN) which comprises a second sub-subnet gateway switch node, and a second sub-subnet manager (SSM);
associating said first sub-subnet manager with a first unique management key, and a first SSN prefix attribute which separately identifies the second subnet and the first SSN; and
associating said second sub-subnet manager with a second unique management key, and a second SSN prefix attribute which separately identifies the second subnet and the second SSN.

12. The method of claim 11, further comprising:
encoding the first SSN prefix attribute as part of said first unique management key, and encoding the second SSN prefix attribute as part of said second unique management key.

13. The method of claim 11, further comprising:
configuring the second subnet to comprise a third sub-subnet (SSN);
configuring the first SSN as a gateway SSN between the second SSN and the third SSN, wherein connectivity through said gateway SSN is managed independently from said second SSN and third SSN.

14. The method of claim 11, wherein:
each sub-subnet gateway switch node can be discovered by a sub-subnet manager in the sub-subnet, when the sub-subnet manager discovers a switch port that has a non-local management key protection, wherein the non-local management key protection has a subnet prefix that is within a defined set of known neighbor sub-subnet prefixes.

15. The method of claim 11, wherein:
said first and second SSN prefix attributes each comprise two non-overlapping parts wherein one part contains a subnet number and another part contains the sub-subnet number.

16. The method of claim 11, wherein:
each of the first sub-subnet gateway switch node and second sub-subnet gateway switch node has at least one sub-subnet gateway port connecting to another sub-subnet gateway switch, and
said first subnet comprises a first subnet gateway switch which has at least one subnet gateway port connecting to a router port.

17. The method of claim 11, further comprising:
providing an inter-domain discovery and routing engine that is responsible for establishing a global fabric view and establishing a deadlock free routing with one or more paths between different end-ports in the IB fabric.

18. The method of claim 11, further comprising:

providing an inter-domain discovery and routing engine which operates in either a fixed-route mode or an on-demand-route mode, to establish a deadlock free routing with one or more paths between different end-ports in the IB fabric;

wherein, in the fixed-route mode, the inter-domain discovery and routing engine analyzes IB fabric topology, and determines if a suitable routing engine exists, and wherein in the on-demand-route mode, the inter-domain discovery and routing engine does not establish a routing until a request for a path between two end points is received.

19. The method of claim 11, further comprising:

configuring the first subnet to comprise a plurality of sub-subnets, including at least a third sub-subnet (SSN) which comprises a third sub-subnet gateway switch node and a third sub-subnet manager, and a fourth sub-subnet (SSN) which comprises a fourth sub-subnet gateway switch node, and a fourth sub-subnet manager (SSM);

associating said third sub-subnet manager with a third unique management key, and a third SSN prefix attribute which separately identifies the first subnet and the third SSN; and associating said fourth sub-subnet manager with a fourth unique management key, and a fourth SSN prefix attribute which separately identifies the first subnet and the fourth SSN.

20. A non-transitory machine readable storage medium having instructions stored thereon for supporting multiple domains in an InfiniBand (IB) fabric, which instruction, when executed in said InfiniBand (IB) fabric, cause the InfiniBand (IB) fabric to perform steps comprising:

providing a plurality of subnets, including a first subnet and a second subnet wherein the first subnet comprises a first subnet manager (SM), and the second subnet comprises a second subnet manager (SM);

configuring the second subnet to comprise a plurality of sub-subnets, including at least a first sub-subnet (SSN) which comprises a first sub-subnet gateway switch node and a first sub-subnet manager, and a second sub-subnet (SSN) which comprises a second sub-subnet gateway switch node, and a second sub-subnet manager (SSM);

associating said first sub-subnet manager with a first unique management key, and a first SSN prefix attribute which separately identifies the second subnet and the first SSN; and associating said second sub-subnet manager with a second unique management key, and a second SSN prefix attribute which separately identifies the second subnet and the second SSN.

\* \* \* \* \*